Jan. 2, 1945.  J. MORKOSKI  2,366,280
WHEEL CONSTRUCTION
Filed April 3, 1943
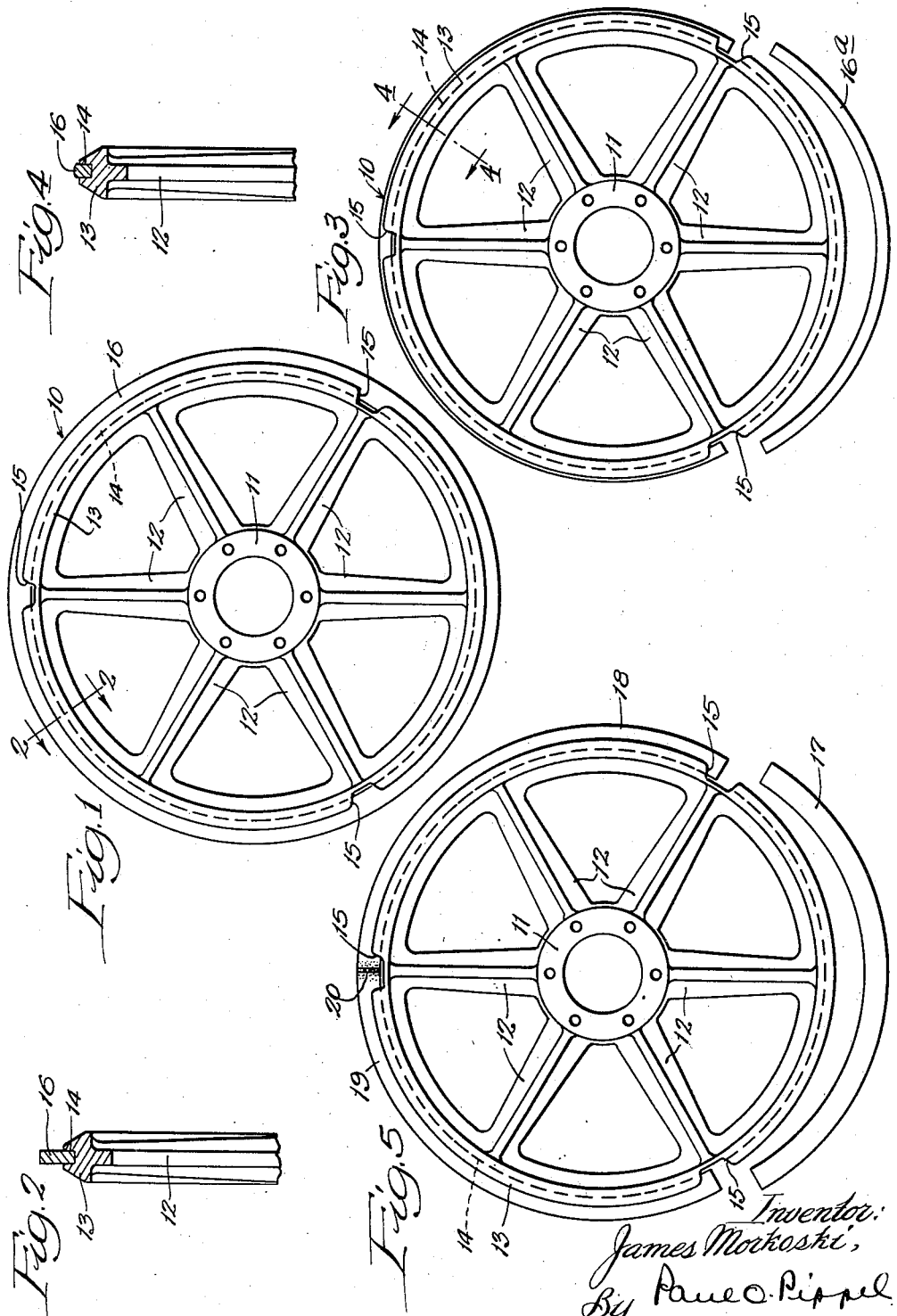
Inventor:
James Morkoski,
By Paul O. Pippel
Attorney.

Patented Jan. 2, 1945

2,366,280

UNITED STATES PATENT OFFICE 2,366,280

WHEEL CONSTRUCTION

James Morkoski, Canton, Ill., assignor to International Harvester Company, a corporation of New Jersey Application April 3, 1943, Serial No. 481,716

5 Claims. (Cl. 301—87)

This invention relates to ground-contacting wheels for agricultural machines. More particularly, the invention concerns ground wheels utilized in conjunction with disk plows and having a wedge-shaped periphery adapted to dig into the ground and offset the side thrust inherent in the operation of such plows. Generally, such wheels comprise a body portion centrally bored for journalling upon a shaft, and a tire portion in the shape of a V in cross section, the apex of which forms a narrow periphery called a skid-ring adapted to cut a furrow in the ground. The base of the V flares outwardly to form the rim portion which rides upon the surface of the ground.

Wheels of the type described wear quickly. The narrow peripheral skid-ring gradually disappears, and the wheel is no longer able to cut a furrow in the ground sufficient to overcome lateral thrust of the plow. Thus, wheels of this type constitute a relatively expensive item of plow equipment, since, once a wheel has lost its power to function in the manner and for the purpose for which it was designed, it must be replaced in its entirety. It is known to provide replaceable skid-rings for plow wheels to be attached thereto by bolts and the like. However, that method has proved very unsatisfactory, because the strain to which the wheel is subjected is so great that the connections become loose and, where the link is attached in sections, the free ends thereof become open and distorted. To manufacture a one-piece skid-ring of great depth for replacement purposes to overcome the disadvantages above mentioned requires expensive equipment, and the cost to the consumer would be prohibitive.

It is an object of the present invention to provide a novel furrow wheel or the like, having a separate and replaceable skid-ring.

Another object is the provision of a skid-ring made from narrow stock and of good wear-resisting material, which is inexpensive to produce and inexpensive to replace.

A further object is the provision of a wheel and replaceable skid-ring and a method for its replacement, whereby the repair cost to the consumer is reduced to a minimum.

These and other objects will become apparent from the following detailed description when read in conjunction with the accompanying drawing, wherein:

Figure 1 shows in elevation a furrow wheel having a one-piece skid-ring thereon;

Figure 2 is a fragmentary section taken along the line 2—2 of Figure 1 and showing the skid-ring fitted into a circumferential groove in the furrow wheel;

Figure 3 is an elevation of the furrow wheel shown in Figure 1 after the skid-ring has become worn, and showing the method of removing the worn skid-ring;

Figure 4 is a section taken along the line 4—4 of Figure 3; and

Figure 5 shows the method of replacing a worn skid-ring with a new skid-ring in segments.

In the view illustrated in Figure 1, the furrow wheel is shown as it is first supplied to the consumer as part of his plow equipment, while Figures 3 and 5 show the successive steps employed in the replacement of the worn skid-ring.

Referring to the drawing, the numeral 10 designates a furrow wheel having a hub 11, radial spokes 12, and a rim or tire portion 13. In the embodiment shown in the drawing, the rim portion 13 is frusto-conical in shape and is provided with a peripheral groove 14. Likewise, at spaced points about the periphery of the rim portion 13, are provided marginal recesses 15 for a purpose to be hereinafter more fully described.

The completed wheel at the time of its shipment from manufacturer to consumer includes a skid-ring 16 rectangular in cross-section, which consists of a single length of narrow stock adapted to fit into the groove 14, and projecting from the rim portion a sufficient distance to provide a ground-cutting edge. Due to the shape of the rim portion 13 and the depth of the groove 14, the skid-ring 16 may be made of a single length of wear-resisting material and yet may be cold-rolled, and the wheel cast into place at a very low cost, the free ends of the ring being welded together and the walls thereof being treated with suitable fusion-resistant material to prevent fusion of the metals. When the skid-ring has become worn, as indicated in Figures 3 and 4, that is, to the point where the entire wheel would have to be replaced, were the skid-ring integral therewith, the worn ring is removed by a simple operation consisting in cutting therethrough in the region of marginal recesses 15. The cut segments, which fit tightly into the groove 14, are readily pried out, and, to assist in this operation, the recesses 15 extend radially inwardly a short distance below the bottom of the groove to allow access for insertion of a thin edged tool. In Figure 3, one of the worn segments 16ᵃ is shown as having been cut away and removed from the wheel.

Figure 5 illustrates the manner in which the worn skid-ring is replaced with a new one. To facilitate replacement, the skid-ring provided by the manufacturer to replace the worn skid-ring is supplied in several pieces or segments designated in the drawing by numerals 17, 18, and 19. These parts are easily bent or shaped by the manufacturer, for example, on a bulldozer, and may be supplied to the consumer as a relatively inexpensive repair part, greatly lengthening the life of the furrow wheel for which it is intended. Segments 18 and 19 are shown in place on the wheel 10 with their end meeting at one of the marginal recesses 15 and welded as at 20. The segment 17 is shown separate from the wheel prior to its insertion in the groove 14 and prior to welding the ends of the segments 18 and 19. The skid-ring may be removed and replaced as often as it wears out. Thus, it will be observed that a wheel for agricultural machines having an inexpensive and easily replaceable skid-ring has been provided, and a simple and effective method has been devised for its replacement. Likewise, it will be noted that the tackiness of the fusion-inhibiting material employed when casting the original skid-ring into place will prevent circumferential displacement thereof with respect to the groove, while the welds 20 will prevent the segmented skid-ring from becoming circumferentially displaced. While the invention has been described with particular reference to its employment as a furrow wheel for plows, it should be clear that it is equally applicable to other implements and to vehicles as well.

Having now described my invention, it is to be understood that variations may be made therein without departing from the spirit thereof or the scope of the appended claims.

What is claimed is:

1. A wheel comprising a body portion and a rim portion, a circumferential groove in the periphery of the rim portion, an annular member removably fitted within said groove, means for preventing said member from becoming circumferentially displaced with respect to said groove, said annular member having an inner circumference approximately equal to the inner circumference of said groove, an outer circumference greater than the outer circumference of said rim portion, and marginal recesses at spaced points about the periphery of said rim portion, said marginal recesses cooperating with said first-mentioned means to prevent circumferential displacement of said annular member.

2. A wheel comprising a body portion and a rim portion, a circumferential groove in the periphery of the rim portion, marginal recesses at spaced points about the periphery of said rim portion, a removable annular member comprising a plurality of segments arranged to fit within said groove and joined end-to-end at said marginal recesses, and means for preventing said annular member from becoming circumferentially displaced with respect to said groove, said means comprising raised portions on said member adjacent said recesses and arranged to engage the walls thereof.

3. A wheel comprising a body portion and a rim portion, a circumferential groove in the periphery of the rim portion, an annular member fitted within said groove, said annular member having an inner circumference approximately equal to the inner circumference of said groove, an outer circumference greater than the outer circumference of said rim portion, and marginal recesses at spaced points about the periphery of said rim portion, said marginal recesses extending radially inwardly to a depth greater than the depth of said circumferential groove, whereby space is provided between the said rim portion and said annular member.

4. A wheel comprising a body portion and a rim portion, a circumferential groove in the periphery of the rim portion, marginal recesses at spaced points about the periphery of said rim portion, a separable annular member comprising a plurality of segments arranged to fit within said groove in end-to-end relation at said marginal recesses, and welds connecting said segments having raised portions arranged to engage the walls of said recesses to prevent circumferential displacement of said member.

5. A wheel comprising a body portion and a rim portion, said rim portion being frusto-conical in section with the narrow width forming the periphery of the rim portion, a circumferential groove of rectangular cross-section in the periphery of the wheel, a skid-ring of rectangular cross-section separably fitted within said groove, said ring having an inner circumference approximately equal to the inner circumference of said groove, and an outer circumference greater than the outer circumference of said tire portion, said ring and said rim portion forming a portion substantially V-shaped in cross-section, and spaced marginal recesses in said rim portion extending radially inwardly to a depth greater than said groove, whereby said skid-ring may be cut into segments for removal from said wheel.

JAMES MORKOSKI.